(12) United States Patent
Lang et al.

(10) Patent No.: US 8,113,078 B2
(45) Date of Patent: Feb. 14, 2012

(54) ENTIRE MACHINE JOG DRIVE

(75) Inventors: Eric Ryan Lang, Donnellson, IA (US);
Darin Ledru Roth, Batavia, IA (US);
Walter Mark Schlesser, Ottumwa, IA (US)

(73) Assignee: Deere & Company, Moline, IL (US)

( * ) Notice: Subject to any disclaimer, the term of this patent is extended or adjusted under 35 U.S.C. 154(b) by 319 days.

(21) Appl. No.: 12/262,383

(22) Filed: Oct. 31, 2008

(65) Prior Publication Data
US 2010/0108413 A1   May 6, 2010

(51) Int. Cl.
*H02K 7/116* (2006.01)
(52) U.S. Cl. ...................................... 74/421 A
(58) Field of Classification Search .............. 74/412 R, 74/421 A; 180/53.1, 53.4, 53.5, 53.8; 56/10.6, 56/10.7, 13.5
See application file for complete search history.

(56) References Cited

U.S. PATENT DOCUMENTS

| 3,513,651 | A | | 5/1970 | Hollyday et al. | |
|---|---|---|---|---|---|
| 4,711,403 | A | * | 12/1987 | Gregory et al. | 241/101.2 |
| 5,339,708 | A | * | 8/1994 | Nakamura | 74/665 A |
| 5,894,718 | A | * | 4/1999 | Hawlas et al. | 56/341 |
| 6,105,353 | A | | 8/2000 | Mohr | |
| 6,651,416 | B2 | * | 11/2003 | Trelstad et al. | 56/341 |

FOREIGN PATENT DOCUMENTS

| EP | 819374 | 1/1998 |
|---|---|---|
| EP | 1340421 | 9/2003 |
| EP | 1974601 | 10/2008 |

OTHER PUBLICATIONS

European Search Report, May 7, 2010, 5 Pages.

* cited by examiner

*Primary Examiner* — Vicky Johnson

(57) ABSTRACT

A work machine jog drive includes a jog motor configured to operate components of the work machine primary drive system in a slow controllable manner to operate performance system components of the work machine for adjustment, maintenance and other purposes.

20 Claims, 4 Drawing Sheets

ENTIRE MACHINE JOG DRIVE

BACKGROUND OF THE INVENTION

The present invention relates to drive systems for work machines such as agricultural balers, and, more particularly, to a jog drive to advance performance systems in the machine in a slow, controllable manner for service and adjustment.

DESCRIPTION OF THE RELATED ART

Work machines, including many agricultural work machines such as balers, are known to use a single drive source to power multiple performance systems each designed to accomplish a task within the overall function of the machine. The performance systems may require periodic maintenance or adjustment for proper operation. Performing the maintenance or adjustment procedure can require precise positioning of the components in the performance system and/or advancing the components through an operating cycle of the system in a slow, controlled manner for observation of the operation of individual components.

An agricultural baler, for example, is known to be powered via the power take-off (PTO) system of a farm tractor used to pull the baler through the field. One performance system in the baler is a knotter system which guides twine to surround a bale being formed, ties the twine and severs the twine to individualize the bale. It is recommended that various components in the knotter system be adjusted frequently for optimum performance. As part of the adjustment or maintenance function, it can be necessary to first move components of the knotter system to prescribed positions for adjustment, and then to rotate the system through a full operating cycle to observe positions and operations of the components during the performance cycle. For example, when adjusting a needle protection linkage in a baler knotter system the baler flywheel is rotated first to position the protection linkage at a precise position for adjusting the needle protection linkage, and then to complete an operating cycle of the knotter system to observe that the protection linkage gap at all times is between prescribed minimum and maximum clearances. Similar procedures are followed for making adjustments to other components of the knotter system, such as the tucker arms, twine fingers and needles.

Rotating the flywheel on small balers can be difficult and, for large square or round balers in which the flywheel can weigh several hundred pounds, two people may be needed for rotating the flywheel manually, while a third person observes the components of the knotter system and communicates to the others when the system is in the proper position for initial adjustment. It can be difficult to have those rotating the flywheel stop the rotation at the precise position desired for components being adjusted. It is necessary for additional people to be available when adjustments are required. An individual operator of the equipment faced with having to make field adjustments may not be able to do so without obtaining help from others.

What is needed in the art is a system that can jog the drive system of the work machine slowly and for minimal distances to move operating components of a performance system in the machine to exact positions required for maintenance or adjustment or to slowly operate the system while being observed.

SUMMARY OF THE INVENTION

The present invention provides a jog drive as an alternative drive source to be used when making adjustments to a performance system of a work machine.

The invention in one form is directed to an agricultural work machine having a performance system for performing a function of the work machine and a primary drive system connectable to a primary power source conveying power to the performance system for operating the performance system at an operating speed. A jog drive system is connectable within the primary drive system for operating the performance system at a maintenance speed slower than the operating speed.

The invention in another form is directed to a work machine having a performance system operating in an operating cycle and a primary drive system connectable to a power source for moving the operating system through the operating cycle at an operating speed. A jog drive system for moving the performance system through at least a portion of the operating cycle at a maintenance speed slower than said operating speed is arranged on the machine.

The invention in still another exemplary form is directed to a method of adjusting a performance system in an agricultural work machine having a primary drive system providing operating power to the performance system, the method having steps of drivingly engaging a jog motor to a component of the primary drive system; operating the jog motor to move a component of the performance system to an adjusting position; and stopping the jog motor when the component reaches the adjusting position.

DETAILED DESCRIPTION OF THE INVENTION

Figure 1:
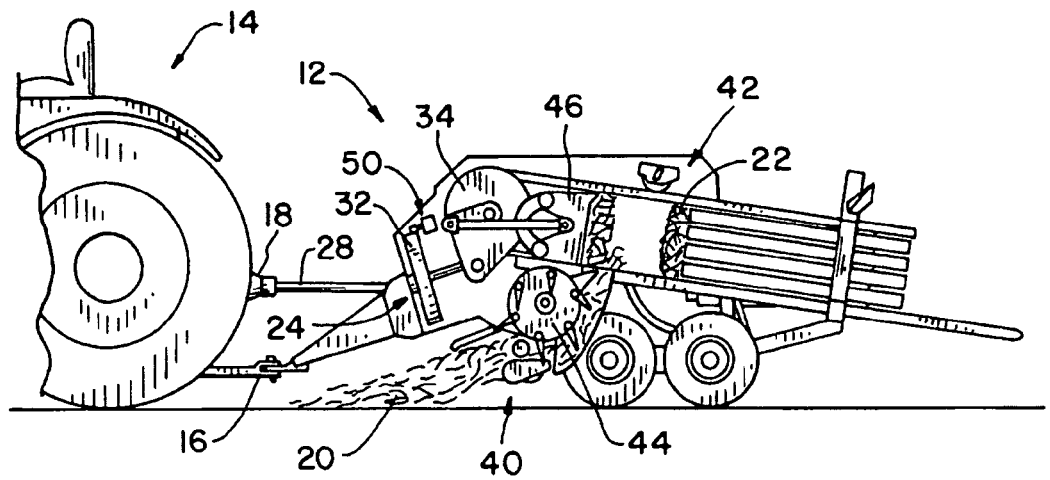
FIG. 1 is a fragmentary side view of an agricultural tractor and baler for which a jog drive system can be used advantageously.

Referring now to the drawings, and more particularly to FIG. 1, there is illustrated a work machine 12 which in the exemplary embodiment shown is an agricultural baler 12. Baler 12 is hitched to a tractor 14 at a drawbar connection 16. A power take off (PTO) 18 supplies power from tractor 14 to baler 12. As tractor 14 pulls baler 12 and baler 12 encounters crop material 20, crop material 20 is pulled into baler 12, compacted, formed and tied with twine to form individual bales 22 that are then ejected from baler 12.

Figure 7:
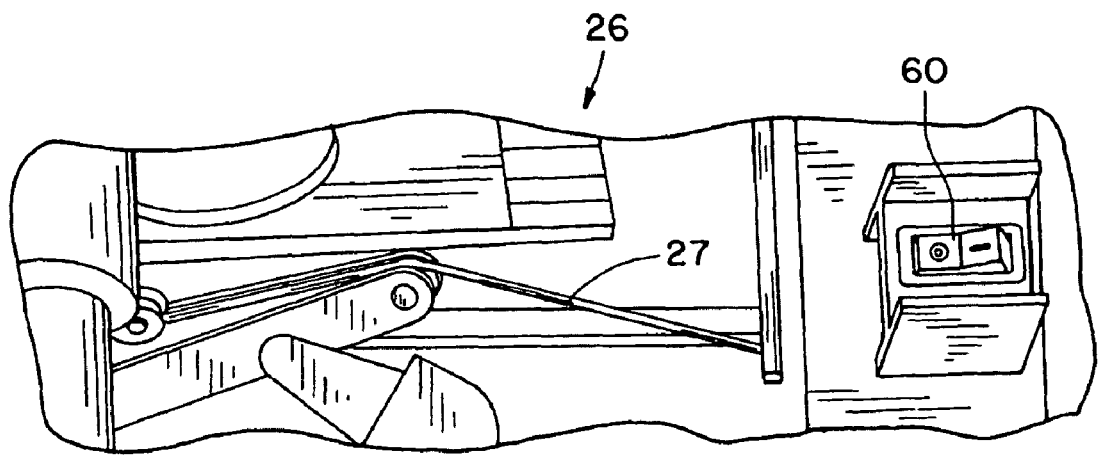
FIG. 7 is a fragmentary perspective view of a baler knotter system with a switch for operating a jog drive system.

Various performance systems in baler 12 are all powered from a primary drive system 24 coupled to tractor PTO 18. One such performance system is a knotter system 26, partially shown in FIG. 7. Knotter system 26 guides and manipulates twine 27 for encircling a bale 22, tying the twine 27 and severing the twine 27 from a continuous supply of twine 27. Knotter system 26 includes a variety of different components and subsystems performing different tasks which must be accomplished quickly and with precision to form a proper knot that will stay tied securely during subsequent handling of the bale 22. Accordingly, periodic adjustment of various components in knotter system 26 is required to maintain optimum performance.

Figure 2:
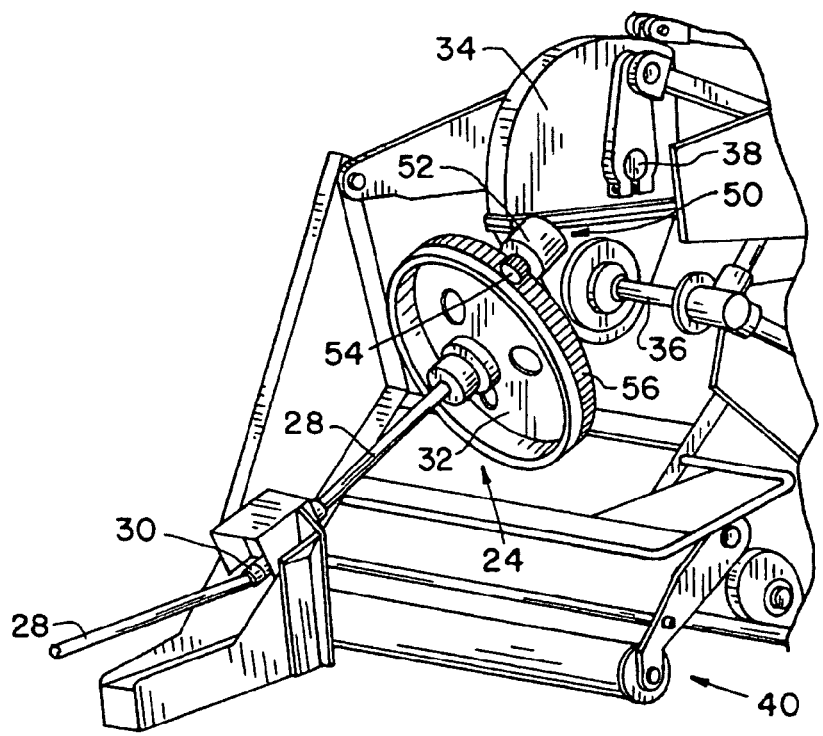
FIG. 2 is a fragmentary perspective view of the baler shown in FIG. 1, illustrating one embodiment of a jog drive system.

With reference to FIG. 2, primary drive system 24 includes a shaft 28 connectable to power take off 18 of tractor 14. Shaft 28 can include several shaft sections connected by universal joints 30 or the like to extend at angles from one another rather than in a straight line. Shaft 28 is drivingly connected to a flywheel 32 which in turn is drivingly connected to a main gearbox 34 having a gear train therein with multiple output shafts 36, 38 extending therefrom to drive various different performance systems of baler 12, including knotter system 26, and performance systems that include a crop pickup head 40, a bale forming arrangement 42 including a feed drum 44 and plunger 46 and various other performance systems for accomplishing specific tasks required in the overall operation of baler 12. Primary drive system 24 thereby receives operating power from tractor 14 as the power source and provides operating power at operating speeds to the various operating components of baler 12 by the input and output connections through main gear box 34.

A jog drive system is drivingly connected within primary drive system 24 and serves as a source of power to the various performance systems in baler 12, including knotter system 26, when movement of components within the performance system is required for maintenance or adjustment. A first exemplary embodiment of a jog drive system 50 includes a jog motor 52 having a drive gear 54 drivingly coupled with gear teeth 56 formed at the perimeter of flywheel 32. Jog motor 52 can be a hydraulic motor, an electric motor or other suitable drive mechanism for slowly rotating flywheel 32 and thereby advancing all performance systems in baler 12, including knotter system 26, slowly through the operating cycles thereof. In some applications, a linear actuator can be used as a jog motor 52 or power input device. Jog motor 52 can be connected to a hydraulic system of tractor 14, to an electric system of tractor 14 or can be provided with other sources of power input.

Jog motor 52 is illustrated in the operating position thereof, with drive gear 54 engaged with gear teeth 56; however, it should be understood that jog motor 52 can be installed on a movable mechanism for moving jog motor 52 into and out of the position shown in FIG. 2 so that when jog motor 52 is not in use drive gear 54 can be disengaged from gear teeth 56.

Jog motor 52 of jog drive system 50 can be activated and deactivated by a switch 60 (FIG. 7) connected thereto and mounted near components of a performance system such as knotter system 26 requiring periodic adjustment or maintenance from a prescribed position. Switch 60 can be connected to the electrical power source for an electric jog motor 52 or can be connected to an electrical power source of a hydraulic pump used with a hydraulic motor as jog motor 52. While observing the position and operation of the components in the performance system, an operator can toggle switch 60 between on and off positions as required to place the components of the performance system at the required positions. Using the remote switch 60 within sight of the components being positioned, an individual working alone can operate a jog drive system 50 while observing the positioning of components in the performance system to ensure proper positioning and functioning. It should be understood that through proper switching and power input, jog drive system 50 can be operated in both forward and reverse modes so that the performance of systems in baler 12 also can be rotated in forward and reverse directions as required. Multiple switches 60 can be used at various locations as required. Paired switches can be provided near the performance system point of adjustment or observation and near the jog motor 52.

Connecting jog drive system 50 through the primary drive system 24 allows for a single jog motor 52 or the like to be used to position all the different performance systems that are connected to the primary drive system 24. The jog drive system 50 can be operated more slowly than the primary power source, similarly to rotating the flywheel 32 by hand, and can be operated under greater control. In addition to use for making adjustments, a jog drive system 50 can be used also for other purposes, such as, for example and not limitation, during routine maintenance and lubrication of drive chains and bearings to facilitate access by moving movable components as necessary to improve access to the bearings or chains. As a still further example, in some applications and uses a jog drive system 50 can be used for unplugging a work machine such as baler 12 by running the machine backward slowly. As a still further example, a jog drive system 50 in some applications of its use can be used as a brake against flywheel 32 rotation.

Figure 3:
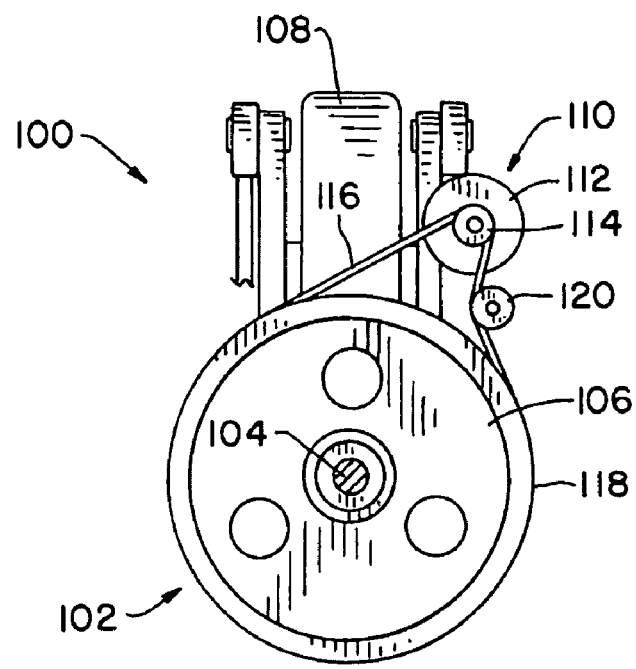
FIG. 3 is a fragmentary elevational view of a baler similar to the baler shown in FIG. 2, but illustrating a second embodiment of a jog drive system.

Jog drive systems similar to jog drive system 50 can be connected to the primary drive system 24 of a work machine such as baler 12 in other ways than in a direct gear couple engagement as illustrated in FIG. 2. FIG. 3 is a fragmentary illustration of a work machine 100, which in the exemplary illustration is a baler 100, with a primary drive system 102 that includes a shaft 104, a flywheel 106 and a main gearbox 108. Another embodiment for an exemplary jog drive system 110 includes a jog motor 112 having a drive pulley 114 and a drive belt 116. Jog motor 112 can be an electric motor, a hydraulic motor or other power input device similar to jog motor 52. Flywheel 106 has a pulley formation 118 therein for receiving and engaging drive belt 116. A belt tensioner 120 can be provided for placing jog drive system 110 in operating and non-operating conditions. Remote operated switches such as switch 60 described previously can be used also with this embodiment and others to be described subsequently herein.

Figure 4:
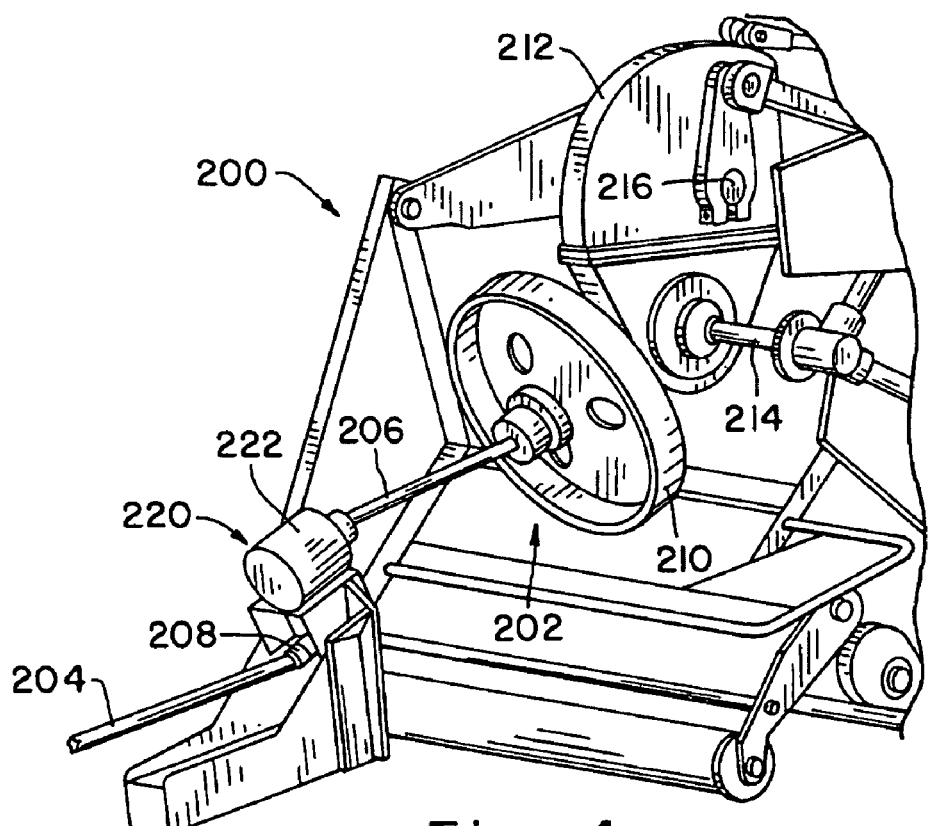
FIG. 4 is a fragmentary perspective view of a baler illustrating a third embodiment of a jog drive system.

Still other embodiments for jog drive systems are contemplated hereby. FIG. 4 is a fragmentary illustration of a work machine 200 similar to baler 12. Work machine 200 has a primary drive system 202 that includes shafts 204 and 206 connected for normal operation at universal connection 208. A flywheel 210 and a main gearbox 212 are drivingly connected one to another, with flywheel 210 connected to shaft 206. Main gearbox 212 has output shafts 214, 216 therefrom. Another embodiment for an exemplary jog drive system 220 includes a jog motor 222 which can be an electric motor, a hydraulic motor or other power input device similar to jog motors 52 and 112 described previously herein. Jog motor 222 is provided near universal connection 208. Shaft 206 is connectable selectively to universal connection 208 or jog motor 222. Disconnection from one and connection to the other can be performed manually or through mechanical means, as those skilled in the art will readily understand. In FIG. 4, shaft 206 is illustrated disconnected from universal connection 208 and connected to jog motor 222. With shaft 206 connected thereto, jog motor 222 can then be used to turn flywheel 210 via the rotational input from shaft 206 connected to jog motor 222.

Figure 5:
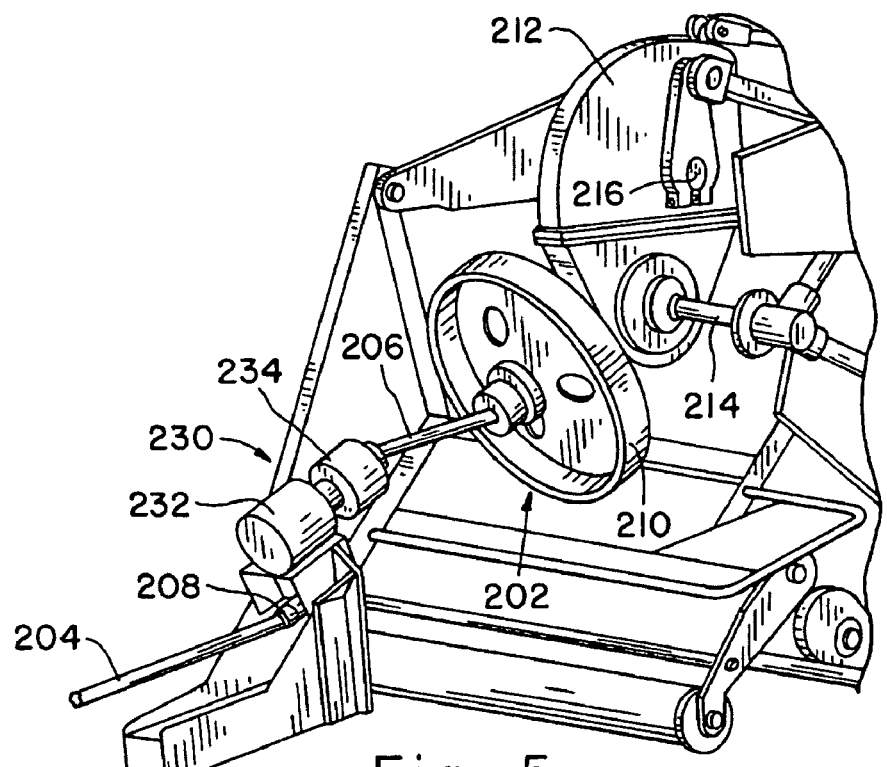
FIG. 5 is a fragmentary perspective view similar to that of FIG. 4, but illustrating a variation of the jog drive system shown in FIG. 4.

FIG. 5 illustrates a variation of jog drive system 220. Components of work machine 200 in FIG. 5 similar to corresponding components shown in FIG. 4 have been identified with like reference numbers. An exemplary jog drive system 230 shown in FIG. 5 includes a jog drive motor 232 that is similar to jog drive motor 222 shown in FIG. 4. In the exemplary embodiment of jog drive system 230, a jog drive gear box 234 is connected to jog motor 232 and is provided for selective connection to shaft 206.

Figure 6:
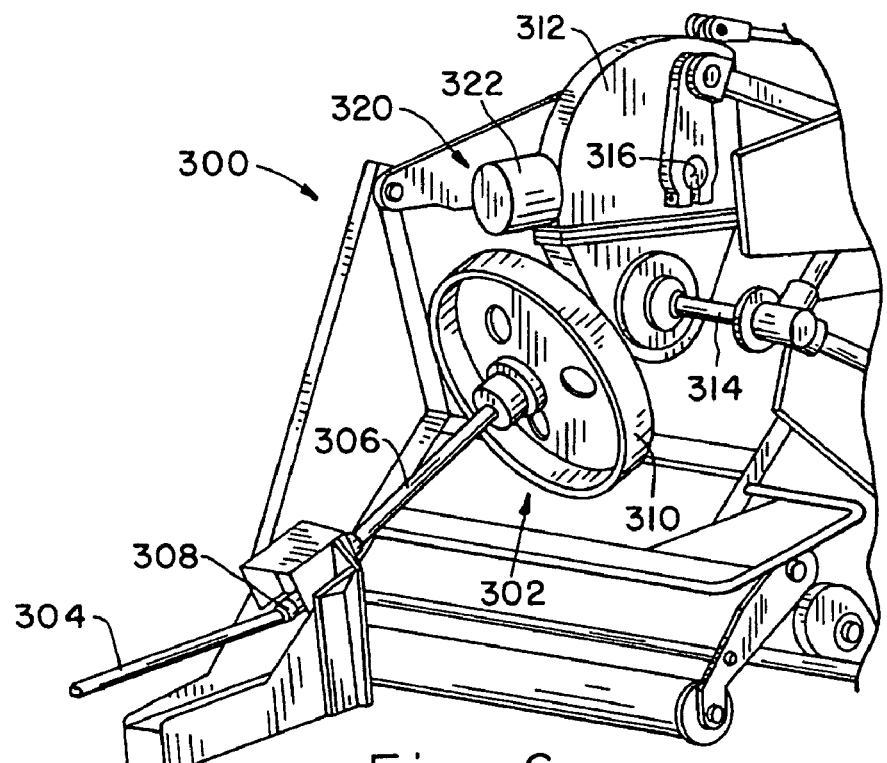
FIG. 6 is a fragmentary perspective view of a baler similar to those shown in the preceding drawings, but illustrating yet another embodiment of a jog drive system.

Yet another embodiment for a jog drive system is shown in FIG. 6, which is a fragmentary illustration of a work machine 300 similar to baler 12. Work machine 300 has a primary drive system 302 that includes shafts 304 and 306 connected at universal connection 308. A flywheel 310 and a main gearbox 312 are drivingly connected one to another, with flywheel 310 connected to shaft 306. Main gearbox 312 has output shafts 314, 316 therefrom. In this exemplary embodiment, a jog drive system 320 includes a jog motor 322 mounted on and connected to main gearbox 312. Jog motor 322 is similar to the other jog motors 52, 112, 222, 232, described herein and can be connected to one or more switch (not shown) located and adapted, for use similarly to switch 60 described previously herein.

Exemplary jog drive systems 50, 110, 220, 230, 320 have been shown and described herein operable on work machine/agricultural balers 12, 100, 200, 300. However, it should be apparent to those skilled in the art from the teachings herein that the agricultural balers shown herein are merely exemplary in nature. Jog drive systems as disclosed can be used on other agricultural work machines, including agricultural work machines such as balers of other types and agricultural work machines for other purposes. Jog drive systems also can be used on non-agricultural work machines such as, for example and not limitation, work machines for construction or other industrial purposes.

Having described the preferred embodiment, it will become apparent that various modifications can be made without departing from the scope of the invention as defined in the accompanying claims.

The invention claimed:

1. An agricultural work machine, comprising:
    a performance system for performing a function of the work machine;
    a primary drive system connectable to a primary power source conveying power to said performance system for operating said performance system at an operating speed; and
    a jog drive system connectable within said primary drive system for operating said performance system at a maintenance speed slower than the operating speed;
    wherein the jog drive system is disengaged from the primary drive system when the primary drive is operated at the operating speed and engaged with the primary drive system for operating the performance system at the maintenance speed, and wherein the jog drive system is operable to selectively operate the performance system at the maintenance speed in both a forward and a reverse direction.

2. The agricultural work machine of claim 1, said jog drive system including a jog motor.

3. The agricultural work machine of claim 2, wherein said jog motor is a hydraulic motor.

4. The agricultural work machine of claim 2, wherein said jog motor is an electric motor.

5. The agricultural work machine of claim 1, wherein said primary drive system includes a flywheel, and said jog drive system includes a jog motor operably coupled to said flywheel.

6. The agricultural work machine of claim 5, wherein said jog drive system includes a drive gear driven by said jog motor and said flywheel has gear teeth thereon operably coupled to said drive gear.

7. The agricultural work machine of claim 5, wherein said jog drive system includes a drive belt operably coupled to said flywheel and said jog motor.

8. The agricultural work machine of claim 1, wherein said jog drive system includes a jog motor, and said primary drive system has a shaft adapted and arranged for selective connection to and disconnection from said jog motor.

9. The agricultural work machine of claim 8, wherein said jog drive system includes a jog gearbox connected to said jog motor and adapted and arranged for selective connection to and disconnection from said shaft.

10. The agricultural work machine of claim 1, wherein said primary drive system has a main gear box, and said jog drive system includes a jog motor operably coupled to said main gearbox.

11. The agricultural work machine of claim 1, said jog drive system including a switch near adjustable components of said performance system, said switch being connected for starting and stopping operation of said jog drive system.

12. A work machine, comprising:
    a performance system operating in an operating cycle;
    a primary drive system connectable to a power source and to the performance system for moving said operating system through the operating cycle at an operating speed; and
    a jog drive system for moving said performance system through at least a portion of said operating cycle at a maintenance speed slower than said operating speed;
    wherein the jog drive system is disengaged from the primary drive system when the primary drive is operated at the operating speed and engaged with the primary drive system for operating the performance system at the maintenance speed, and wherein the jog drive system is operable to selectively operate the performance system at the maintenance speed in both a forward and a reverse direction.

13. The work machine of claim 12, said jog drive system including a jog motor drivingly engaged with a component of said primary drive system.

14. The work machine of claim 12, said primary drive system including a flywheel, and said jog drive system including a jog motor connected to said flywheel.

15. The work machine of claim 14, said jog motor connected to said flywheel by a gear.

16. The work machine of claim 14, said jog motor connected to said flywheel by a drive belt.

17. The work machine of claim 12, said jog drive system including a jog motor and said primary drive system including a shaft selectably connectable to and disconnectable from said jog motor.

18. The work machine of claim 12, said primary drive system including a main gearbox and said jog drive system including a jog motor connected to said main gearbox.

19. A method of adjusting a performance system in an agricultural work machine having a primary drive system providing operating power to the performance system, said method of adjusting the performance system comprising steps of:
    drivingly engaging a jog motor to a component of the primary drive system;
    operating the jog motor to move a component of the performance system to an adjusting position;
    stopping said step of operating the jog motor when the component reaches the adjusting position; and
    disengaging the jog motor during operation of the primary drive system at an operating speed.

20. The method of claim 19, further comprising a step of operating the jog motor to cycle the performance system through an entire operating cycle of the performance system.

* * * * *